US009560587B2

(12) United States Patent
Kondabattini et al.

(10) Patent No.: US 9,560,587 B2
(45) Date of Patent: Jan. 31, 2017

(54) POWER SAVING IN SOFT ACCESS POINT DEVICES

(71) Applicant: QUALCOMM Incorporated, San Diego, CA (US)

(72) Inventors: Ganesh Kondabattini, Hyderabad (IN); Deepak Jindal Kumar, Hyderabad (IN); Sudheer Kumar Suryadevara, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 1024 days.

(21) Appl. No.: 13/669,234

(22) Filed: Nov. 5, 2012

(65) Prior Publication Data
US 2014/0126439 A1 May 8, 2014

(51) Int. Cl.
H04W 52/02 (2009.01)
(52) U.S. Cl.
CPC .......... *H04W 52/0206* (2013.01); *Y02B 60/50* (2013.01)
(58) Field of Classification Search
CPC .................................. H04W 52/0206
See application file for complete search history.

(56) References Cited

U.S. PATENT DOCUMENTS

| 8,346,171 | B1* | 1/2013 | Mack ........................... 455/63.1 |
| 2010/0157865 | A1* | 6/2010 | Iyer et al. ..................... 370/311 |
| 2010/0284316 | A1 | 11/2010 | Sampathkumar |
| 2011/0059779 | A1 | 3/2011 | Thomas et al. |
| 2011/0069650 | A1 | 3/2011 | Singh et al. |

OTHER PUBLICATIONS

Shih-Lin Wu et al: "An energy efficient MAC protocol for IEEE 802.11 WLANs" Communication Networks and Services Research, 2004. Proceedings. Second Annual Conference on Freeericton, NB,Canada May 19-21, 2004, Piscataway, NJ,USA, IEEE , May 19, 2004 (May 19, 2004), pp. 137-145, XP010732725.

\* cited by examiner

*Primary Examiner* — Siming Liu
(74) *Attorney, Agent, or Firm* — Kevin T. Cheatham

(57) ABSTRACT

A method and apparatus to save power in a soft access point for a network. If no network traffic is detected for an integral number of TBTT (Target Beacon Transmission Time) intervals immediately prior to a current TBTT interval, and if no network traffic is detected for a first time slot in the current TBTT interval, then the soft access point sends a CTS (Clear-to-Send) packet addressed to itself to quiet the network for a second time slot and enters a low power mode for the second time slot. At the beginning of a third time slot, the soft access point puts itself into an active mode and monitors network traffic.

40 Claims, 4 Drawing Sheets

POWER SAVING IN SOFT ACCESS POINT DEVICES

FIELD OF DISCLOSURE

The present invention relates to wireless communication systems, and more particularly to soft access point devices.

BACKGROUND

Many types of cell phones and mobile devices can be configured to serve as access points for wireless local area networks. For example, if a landline Internet connection is not available, one may configure a cell phone as a hot spot for other devices, such as a laptop, so that the laptop may connect with the Internet. In such situations, it is desirable to efficiently use the battery power of the cell phone so that the wireless local area network may be up and running as long as possible.

SUMMARY

Embodiments of the invention are directed to systems and methods for power saving in soft access point devices.

In one embodiment, a method of operating a soft access point in a wireless network includes monitoring with the soft access point the network for network activity in a first time slot of a current TBTT (Target Beacon Transmission Time) interval; sending with the soft access point a CTS (Clear-To-Send) packet addressed to itself and entering a low power state for a second time slot in the current TBTT interval provided the soft access point detects no network activity for N consecutive TBTT intervals immediately prior to the current TBTT interval, where N is an integer greater than one, and provided the soft access point detects no network activity during the first time slot; and entering an active state of the soft access point at the beginning of a third time slot in the current TBTT interval In another embodiment, a method of operating a soft access point in a wireless network includes transmitting by the soft access point a frame at the beginning of a current TBTT interval to at least one device in the wireless network to silence transmissions from the at least device during a portion of the current TBTT interval provided the soft access point detects no network activity for N consecutive TBTT intervals immediately prior to the current TBTT interval, where N is an integer greater than one.

In another embodiment, a soft access point in a wireless network includes an antenna; a modem coupled to the antenna; and a processor coupled to the modem. The processor to monitors for network activity detected by the modem in a first time slot of a current TBTT (Target Beacon Transmission Time interval); causes the modem to send a CTS (Clear-To-Send) packet addressed to the soft access point and put itself into a low power state for a second time slot in the current TBTT interval provided the modem detects no network activity for N consecutive TBTT intervals immediately prior to the current TBTT interval, where N is an integer greater than one, and provided the modem detects no network activity during the first time slot; and puts itself into an active state at the beginning of a third time slot in the current TBTT interval.

In another embodiment, instructions stored on a computer readable storage medium cause a processor in a soft access point to perform a procedure comprising monitoring with the soft access point the network for network activity in a first time slot of a current TBTT (Target Beacon Transmission Time interval); sending with the soft access point a CTS (Clear-To-Send) packet addressed to itself and entering a low power state for a second time slot in the current TBTT interval provided the soft access point detects no network activity for N consecutive TBTT intervals immediately prior to the current TBTT interval, where N is an integer greater than one, and provided the soft access point detects no network during the first time slot; and entering an active state of the soft access point at the beginning of a third time slot in the current TBTT interval.

In another embodiment, a soft access point in a wireless network includes means for monitoring, wherein the means for monitoring monitors the network for network activity in a first time slot of a current TBTT (Target Beacon Transmission Time interval); means for transmitting, wherein the means for transmitting transmits a CTS (Clear-To-Send) packet addressed to the soft access point provided the means for monitoring detects no network activity for N consecutive TBTT intervals immediately prior to the current TBTT interval, where N is an integer greater than one, and provided the means for monitoring detects no network activity during the first time slot; and means for changing power mode, wherein the means for changing power mode puts the soft access point into a low power state for a second time slot in the current TBTT interval provided the means for monitoring detects no network activity for N consecutive TBTT intervals immediately prior to the current TBTT interval, and provided the means for monitoring detects no network activity during the first time slot; wherein the means for changing power mode puts the soft access point into an active state at the beginning of a third time slot in the current TBTT interval.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The term "embodiments of the invention" does not require that all embodiments of the invention include the discussed feature, advantage or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. Specific circuits (e.g., application specific integrated circuits (ASICs)), program instructions being executed by one or more processors, or a combination of both, may perform the various actions described herein. Additionally, the sequences of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Figure 1:
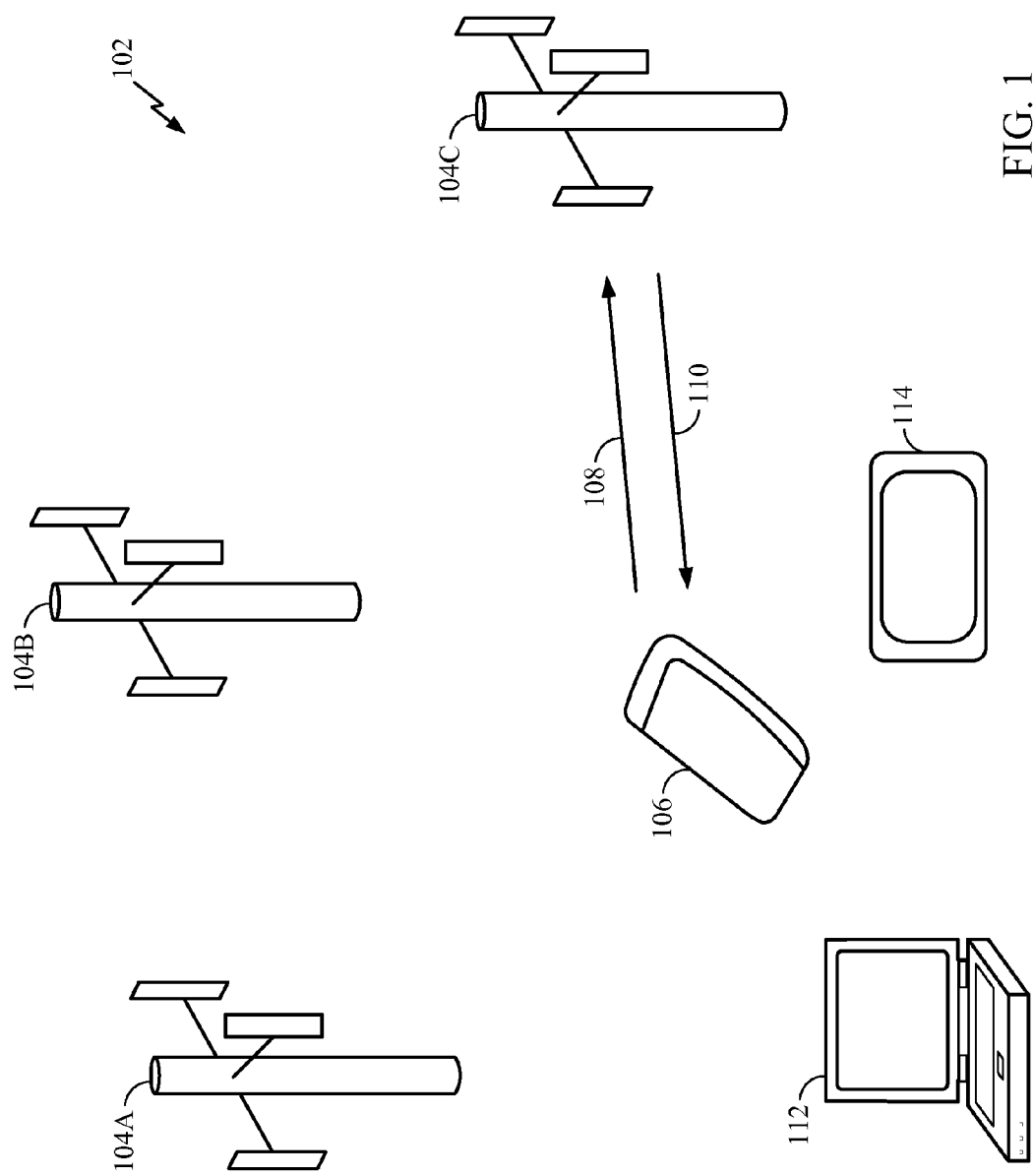
FIG. 1 illustrates a wireless communication system in which embodiments may find application.

Embodiments may find widespread application in numerous systems, such as a wireless communication system, and more particularly a cellular phone network. For example, FIG. 1 illustrates Wireless Communication System 102 comprising Base Stations 104A, 104B, and 104C. FIG. 1 shows a communication device, labeled 106, which may be a mobile cellular communication device such as a so-called smart phone, a tablet, or some other kind of communication device suitable for a wireless communication system. Communication Device 106 need not be mobile. In the particular example of FIG. 1, Communication Device 106 is located within the cell associated with Base Station 104C. Arrows 108 and 110 pictorially represent the uplink channel and the downlink channel, respectively, by which Communication Device 106 communicates with Base Station 104C.

Communication Device 106 may serve as an access point to provide an Internet connection for other wireless devices. For example, Communication Device 106, Laptop 112, and Tablet 114 form a WLAN (Wireless Local Access Network), with Communication Device 106 serving as the access point (i.e., hotspot). In this instance, communication device 106 serves as a soft access point, where it's mode of operation is configured by software. The WLAN may, for example, conform to the IEEE (Institute of Electrical and Electronics Engineers) 802.11g WLAN standard.

Figure 2:
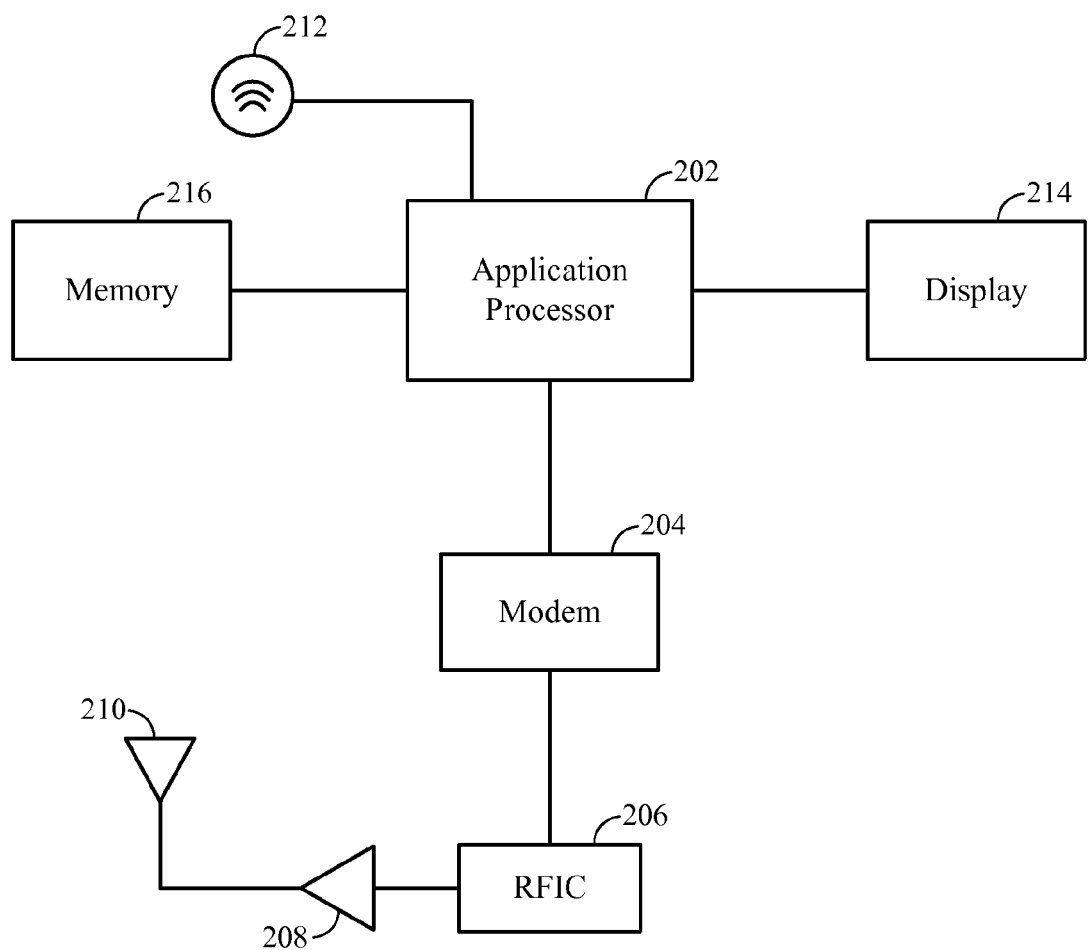
FIG. 2 illustrates a mobile phone platform in which embodiments may be embedded.

FIG. 2 illustrates a simplified abstraction of a mobile platform that may find application in Communication Device 106. Shown in FIG. 2 are Application Processor 202, Modem 204, Radio Frequency Integrated Circuit (RFIC) 206, Power Amplifier 208, Radio Frequency (RF) Antenna 210, Wireless Local Area Network (WLAN) Module 212, Display 214, and Memory 216. For simplicity, not all components typically found in a mobile platform are illustrated in FIG. 2. The modules illustrated in FIG. 2 may comprise one or more discrete integrated circuits. Software stored in Memory 216 when executed by Application Processor 202 configures the mobile platform (e.g., Communication Device 106) so that it may operate as a soft access point for a WLAN.

When Communication Device 106 serves as an access point, it periodically transmits Beacon frames at Target Beacon Transmission Time (TBTT) intervals. In an embodiment, Communication Device 106 saves power when operating as a soft access point by putting itself into a power saving mode (e.g., sleep state) at various time intervals, depending upon the state of the WLAN. Software stored in Memory 216 configures Application Processor 202 such that when the WLAN is inactive for a time interval spanning N TBTT intervals, Application Processor 202 sends a CTS (Clear-To-Send) packet addressed to itself over the WLAN for a period of X milliseconds, and then goes into a power saving mode. Here, N is an integer and X is some positive number, which may be stored in Memory 216. By sending itself a CTS packet, Communication Device 106 takes advantage of the CTS-to-self protection method described in the IEEE 802.11g standard to prevent other clients on the WLAN from transmitting over the medium for some period of time.

Some embodiments may help insure the availability of Communication Device 106 to other devices on the WLAN as follows. A TBTT interval may be viewed as being divided into four slots, with each time slot equal to 25 milliseconds. When Communication Device 106 detects inactivity for N consecutive TBTT intervals, at the next TBTT interval it will be available to other stations and will listen during the first time slot to check whether any associated station begins a transmission. If there is no activity detected in the first time slot, Communication Device 106 sends itself a CTS packet at the beginning of the second slot time and puts itself into a power saving mode for the duration of the second slot time. It will then wake up at the end of the second time slot so that it will be in an active mode for the third time slot. If there is no activity detected for the third time slot, then again it sends a self-CTS packet at the beginning of the fourth time slot and goes into the power saving mode for the duration of the fourth time slot. The Communication Device 106 will wake itself up at the end of the fourth time slot so as to be available to other stations for the next TBTT interval.

Embodiments are not limited to dividing a TBTT interval into four time slots. More generally, a TBTT interval may be divided into n time slots, where n is an integer, not necessarily equal to four.

Figure 3:
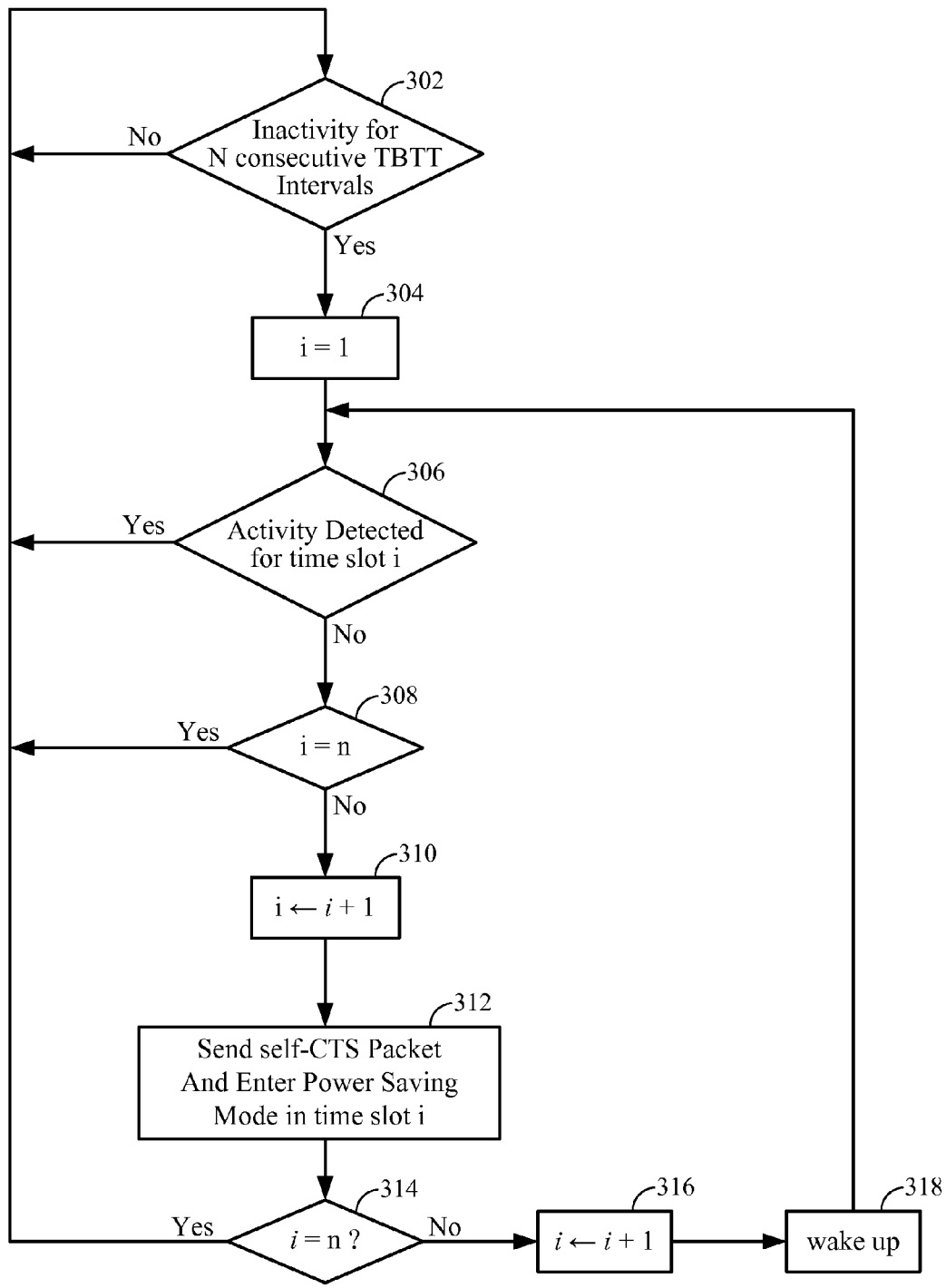
FIG. 3 illustrates a method for power saving in a soft access point device according to an embodiment.

FIG. 3 illustrates a flow diagram for the above-described embodiment, generalized to where a TBTT interval is divided into an arbitrary number of n time slots. The flow diagram begins with Communication Device 106 determining if there is any activity for N consecutive TBTT intervals (302). Once N consecutive TBTT intervals have elapsed for which no activity has been detected, an index i for counting time slots is initialized to one (304), and Communication Device 106 determines whether there is any activity in time slot i for the TBTT interval immediately following the N consecutive TBTT intervals for which no activity was detected (304).

If activity is detected at any time during time slot i (306), then control is brought back to 302 and the process of detecting whether there is any activity for N consecutive TBTT intervals begins anew; but if no such activity is detected, then the counter index i is tested against n (308). If i=n, then the end of the current TBTT interval has been reached, in which case control is brought to 302. But if i<n, then the end of the current TBTT interval has not yet been reached, in which case the counter index i is incremented by one (310), and Communication Device 106 sends a self CTS packet and enters into a power saving mode for the duration of time slot i (312).

A determination is again made as to whether i=n to determine if the end of the current TBTT interval has been reached (314). If i=n, then control is brought back to 302, otherwise, the counter index i is incremented by one (316), Communication Device 106 exits out of the power saving mode (318), and control is brought back to 306.

As a specific example, for a TBTT interval of 100 ms, if n=4 then a TBTT interval is divided into 4 slots of 25 ms duration each. After N consecutive TBTT intervals of no activity, Communication Device 106 listens during the first 25 ms slot in the N+1 TBTT interval. If there is no activity, then Communication Device 106 puts itself into a power saving mode for the second 25 ms slot, and causes the WLAN to be quiet during the second 25 ms slot by sending a self-CTS packet. Communication Device 106 then wakes up and listens during the third 25 ms slot. If no activity is detected during the third 25 ms slot, then Communication Device 106 puts itself into a power saving mode for the fourth 25 ms slot, and causes the WLAN to be quiet by sending a self-CTS packet. As a result, if no activity is detected during the first and third 25 ms slots, Communication Device 106 will be in a power saving mode during the second and fourth 25 ms slots.

Figure 4:
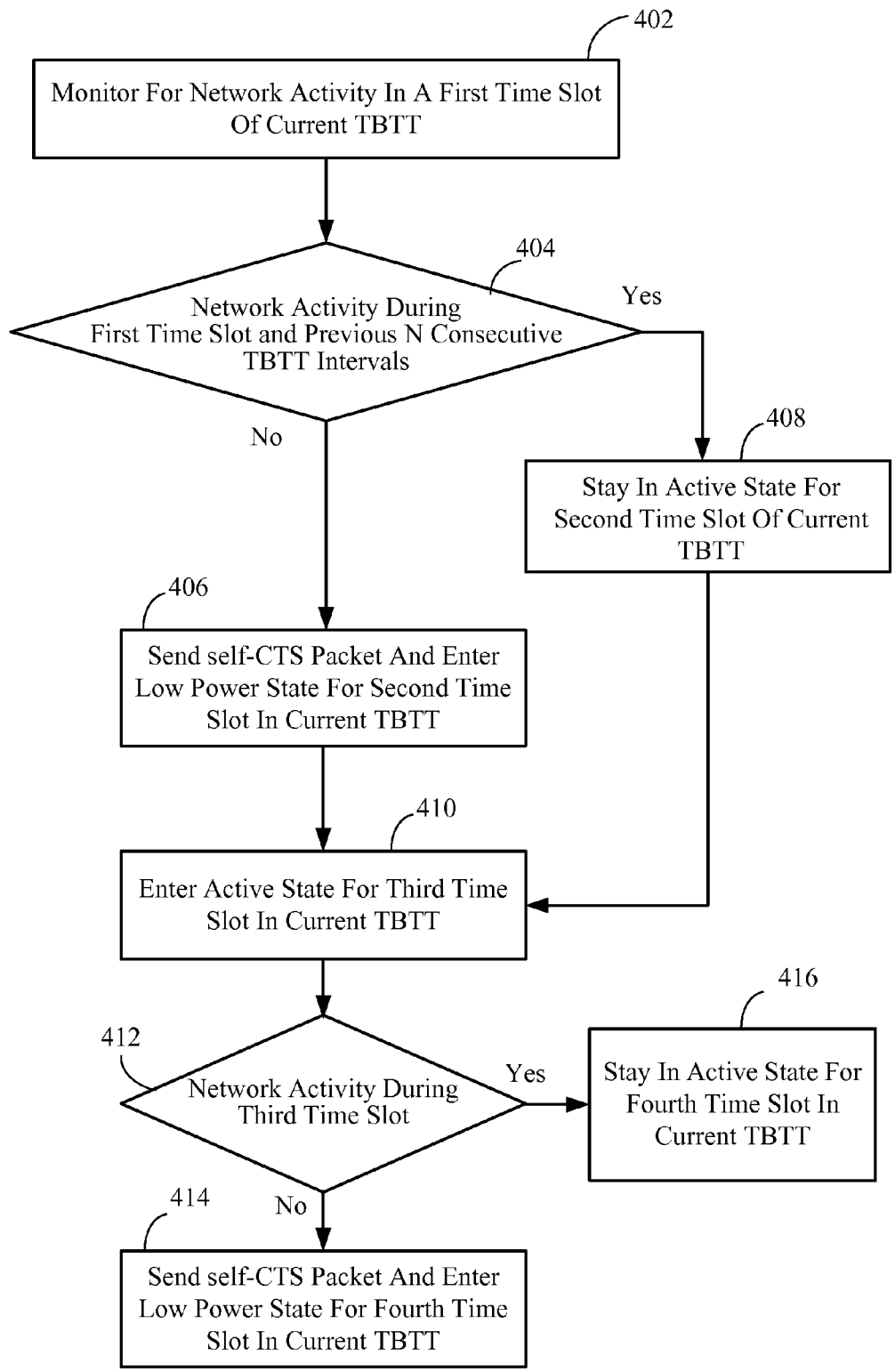
FIG. 4 illustrates a method for power saving in a soft access point device according to another embodiment.

FIG. 4 illustrates a flow diagram for the above-described embodiment. Network activity is monitored during a first time slot of a current TBTT (402). Provided the soft access point detects no network during the first time slot and no network activity for N consecutive TBTT intervals immediately prior to the current TBTT interval (404), the soft access point sends a CTS packet addressed to itself and enters a low power state for a second time slot in the current TBTT interval (406). Otherwise, the soft access point stays in an active state for the second time slot of the current TBTT (408). The soft access point then enters the active state for the third time slot in the current TBTT (410). The network is monitored for activity during the third time slot, and if no network activity is detected during third time slot (412), then the soft access point sends a CTS packet addressed to itself and enters the low power state for a fourth time slot in the current TBTT interval (414). Otherwise, the soft access point stays in the active state during the fourth time slot of the current TBTT (416).

In another embodiment, for the 5 GHz band, a Quiet Information element in Beacon frames or Probe Response frames may be utilized by Communication Device 106 to put itself into a power saving mode instead of sending a self-CTS packet. The Quiet Information element defines an interval during which no transmission shall occur in the current channel in a BSS (Basic Service Set) or IBSS (Independent Basic Service Set). To ensure that not all quiet intervals have the same timing relationship to TBTT intervals, multiple independent quiet intervals may be scheduled by including multiple Quiet Information elements in Beacon frames or Probe Response frames. That is, more than one quiet interval may be scheduled between two successive Beacon frames.

For the 802.11g specification, a Quiet Information element comprises a number of fields, each an octet in length: an Element ID field, a Length field, a Quiet Count field, a Quiet Period field, a Quiet Duration field, and a Quiet Offset field. An example embodiment may include two Quiet Information elements in a Beacon frame: a first Quiet Information element with a Quiet Offset field set to 25 ms and a second Quiet Information element with a Quiet Offset field set to 75 ms. Each Quiet Information element has a Length field set to 6, a Quiet Count field set to 1 so that a quiet interval will start during the Beacon frame interval starting at the next TBTT interval, a Quiet Period field set to 0 so that there is no periodic quiet intervals, and a Quiet Duration field set to 25 ms.

With the above parameters, the WLAN will be quiet during the second and fourth 25 ms slots, and Communication Device 106 can put itself into a power saving mode during these time slots.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an embodiment of the invention can include a computer readable media embodying a method for power saving in soft access point devices. Accordingly, the invention is not limited to illustrated examples and any means for performing the functionality described herein are included in embodiments of the invention.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method for operating a soft access point in a wireless network, the method comprising:
   monitoring with the soft access point the network for network activity in a first time slot of a current TBTT (Target Beacon Transmission Time) interval;
   sending with the soft access point a CTS (Clear-To-Send) packet addressed to itself and entering a low power state for a second time slot in the current TBTT interval provided the soft access point detects no network activity for N consecutive TBTT intervals immediately prior to the current TBTT interval, where N is an integer greater than one, and provided the soft access point detects no network activity during the first time slot; and entering an active state of the soft access point at the beginning of a third time slot in the current TBTT interval;

wherein the first, second, and third times slots are each equal in time length.

2. The method of claim 1, further comprising:
staying in the active state of the soft access point during the second time slot provided the soft access point detects network activity during the first time slot.

3. The method of claim 1, further comprising:
monitoring with the soft access point for network activity during the third time slot, and sending with the soft access point a CTS packet addressed to itself and entering the low power state for a fourth time slot in the current TBTT interval provided the soft access point detects no network activity during the third time slot.

4. The method of claim 3, wherein the first, second, third, and fourth times slots are each equal in time length.

5. The method of claim 3, wherein the current TBTT interval consists of the first, second, third, and fourth time slots.

6. The method of claim 3, further comprising:
staying in the active state of the soft access point during the fourth time slot provided the soft access point detects network activity during the third time slot.

7. The method of claim 6, further comprising:
staying in the active state of the soft access point during the second time slot provided the soft access point detects network activity during the first time slot.

8. The method of claim 1, wherein the soft access point comprises a cellular phone.

9. The method of claim 1, wherein transmission of the CTS packet conforms to the IEEE 802.11g standard.

10. A method for operating a soft access point in a wireless network comprising at least one device, the method comprising:
transmitting by the soft access point a frame at the beginning of a current TBTT interval to the at least one device to silence transmissions from the at least device during a portion of the current TBTT interval provided the soft access point detects no network activity for N consecutive TBTT intervals immediately prior to the current TBTT interval, where N is an integer greater than one;

wherein the current TBTT interval comprises first, second, and third times slots, and wherein the first, second, and third times slots are each equal in time length.

11. The method of claim 10, wherein the frame is comprises a Quiet Information element according to the IEEE 802.11g standard to silence transmissions from the at least one device during the portion of the current TBTT interval.

12. The method of claim 10, wherein the frame is a Beacon frame.

13. The method of claim 10, wherein the portion comprises a first slot and a second slot of the current TBTT interval, the second slot not contiguous in time with the first slot.

14. A soft access point in a wireless network, the soft access point comprising:
an antenna;
a modem coupled to the antenna; and
a processor coupled to the modem, the processor to monitor for network activity detected by the modem in a first time slot of a current TBTT (Target Beacon Transmission Time interval);

cause the modem to send a CTS (Clear-To-Send) packet addressed to the soft access point and put itself into a low power state for a second time slot in the current TBTT interval provided the modem detects no network activity for N consecutive TBTT intervals immediately prior to the current TBTT interval, where N is an integer greater than one, and provided the modem detects no network activity during the first time slot; and put itself into an active state at the beginning of a third time slot in the current TBTT interval;

wherein the first, second, and third times slots are each equal in time length.

15. The soft access point of claim 14, wherein the processor continues in the active state during the second time slot provided the modem detects network activity during the first time slot.

16. The soft access point of claim 14, wherein the modem sends a CTS packet addressed to the soft access point and the processor enters the low power state for a fourth time slot in the current TBTT interval provided the modem detects no network activity during the third time slot.

17. The soft access point of claim 16, wherein the first, second, third, and fourth times slots are each equal in time length.

18. The soft access point of claim 16, wherein the current TBTT interval consists of the first, second, third, and fourth time slots.

19. The soft access point of claim 16, the processor to stay in the active state during the fourth time slot provided the modem detects network activity during the third time slot.

20. The soft access point of claim 19, the processor to stay in the active during the second time slot provided the modem detects network activity during the first time slot.

21. The soft access point of claim 14, wherein the soft access point comprises a cellular phone.

22. The soft access point of claim 14, wherein the CTS packet conforms to the IEEE 802.11g standard.

23. A non-transitory computer readable storage medium having stored instructions, the stored instructions when executed by a processor in a soft access point to perform a procedure comprising:
monitoring with the soft access point the network for network activity in a first time slot of a current TBTT (Target Beacon Transmission Time interval);

sending with the soft access point a CTS (Clear-To-Send) packet addressed to itself and entering a low power state for a second time slot in the current TBTT interval provided the soft access point detects no network activity for N consecutive TBTT intervals immediately prior to the current TBTT interval, where N is an integer greater than one, and provided the soft access point detects no network during the first time slot; and entering an active state of the soft access point at the beginning of a third time slot in the current TBTT interval;

wherein the first, second, and third times slots are each equal in time length.

24. The computer readable storage medium of claim 23, the procedure further comprising:
staying in the active state of the soft access point during the second time slot provided the soft access point detects network activity during the first time slot.

25. The computer readable storage medium of claim 23, the procedure further comprising:
  monitoring with the soft access point for network activity during the third time slot, and sending with the soft access point a CTS packet addressed to itself and entering the low power state for a fourth time slot in the current TBTT interval provided the soft access point detects no network activity during the third time slot.

26. The computer readable storage medium of claim 25, wherein the first, second, third, and fourth times slots are each equal in time length.

27. The computer readable storage medium of claim 25, wherein the current TBTT interval consists of the first, second, third, and fourth time slots.

28. The computer readable storage medium of claim 25, the procedure further comprising:
  staying in the active state of the soft access point during the fourth time slot provided the soft access point detects network activity during the third time slot.

29. The computer readable storage medium of claim 28, the procedure further comprising:
  staying in the active state of the soft access point during the second time slot provided the soft access point detects network activity during the first time slot.

30. The computer readable storage medium of claim 23, wherein the soft access point comprises a cellular phone.

31. The computer readable storage medium of claim 23, wherein transmission of the CTS packet conforms to the IEEE 802.11g standard.

32. A soft access point in a wireless network comprising:
  means for monitoring, wherein the means for monitoring monitors the network for network activity in a first time slot of a current TBTT (Target Beacon Transmission Time interval);
  means for transmitting, wherein the means for transmitting transmits a CTS (Clear-To-Send) packet addressed to the soft access point provided the means for monitoring detects no network activity for N consecutive TBTT intervals immediately prior to the current TBTT interval, where N is an integer greater than one, and provided the means for monitoring detects no network activity during the first time slot; and
  means for changing power mode, wherein the means for changing power mode puts the soft access point into a low power state for a second time slot in the current TBTT interval provided the means for monitoring detects no network activity for N consecutive TBTT intervals immediately prior to the current TBTT interval, and provided the means for monitoring detects no network activity during the first time slot;
  wherein the means for changing power mode puts the soft access point into an active state at the beginning of a third time slot in the current TBTT interval; and
  wherein the first, second, and third times slots are each equal in time length.

33. The soft access point of claim 32, wherein the means for changing power mode keeps the soft access point in the active state during the second time slot provided the means for monitoring detects network activity during the first time slot.

34. The soft access point of claim 32, wherein
  the means for transmitting transmits a CTS packet addressed to the soft access point provided the means for monitoring detects no network activity during a third time slot; and
  the means for changing power mode puts the soft access point into the low power state for a fourth time slot in the current TBTT interval provided the means for monitoring detects no network activity during the third time slot.

35. The soft access point of claim 34, wherein the first, second, third, and fourth times slots are each equal in time length.

36. The soft access point of claim 34, wherein the current TBTT interval consists of the first, second, third, and fourth time slots.

37. The soft access point of claim 34, wherein the means for changing power mode keeps the soft access point in the active state during the fourth time slot provided the means for monitoring detects network activity during the third time slot.

38. The soft access point of claim 37, wherein the means for changing power mode keeps the soft access point in the active state during the second time slot provided the means for monitoring detects network activity during the first time slot.

39. The soft access point of claim 32, wherein the soft access point comprises a cellular phone.

40. The soft access point of claim 32, wherein transmission of the CTS packet conforms to the IEEE 802.11g standard.

* * * * *